United States Patent
Foley et al.

(10) Patent No.: US 9,430,216 B2
(45) Date of Patent: Aug. 30, 2016

(54) SELF-CONTAINED EXECUTABLE FOR PREDETERMINED SOFTWARE UPDATING

(71) Applicant: LUMENSION SECURITY, INC., Scottsdale, AZ (US)

(72) Inventors: Rodney S. Foley, Scottsdale, AZ (US); Joshua D. Bahnsen, Anthem, AZ (US)

(73) Assignee: LUMENSION SECURITY, INC., Scottsdale, AZ (US)

(*) Notice: Subject to any disclaimer, the term of this patent is extended or adjusted under 35 U.S.C. 154(b) by 0 days.

(21) Appl. No.: 14/274,727

(22) Filed: May 11, 2014

(65) Prior Publication Data
US 2015/0324184 A1    Nov. 12, 2015

(51) Int. Cl.
| G06F 9/44 | (2006.01) |
| G06F 9/445 | (2006.01) |
| H04L 29/08 | (2006.01) |
| H04M 1/725 | (2006.01) |
| G06F 11/14 | (2006.01) |

(52) U.S. Cl.
CPC .............. *G06F 8/65* (2013.01); *H04L 67/10* (2013.01); *G06F 8/60* (2013.01); *G06F 8/61* (2013.01); *G06F 11/1433* (2013.01); *H04M 1/72525* (2013.01); *H04M 2203/052* (2013.01); *Y02B 60/183* (2013.01)

(58) Field of Classification Search
CPC ............. G06F 8/65; G06F 8/61; G06F 8/60; G06F 11/1433; H04M 1/72525; H04M 2203/052; Y02B 60/183
See application file for complete search history.

(56) References Cited

U.S. PATENT DOCUMENTS

| 6,675,382 B1* | 1/2004 | Foster ................. G06F 8/61 707/999.001 |
| 7,020,875 B2* | 3/2006 | Zweifel ................ G06F 8/61 717/168 |
| 7,062,765 B1* | 6/2006 | Pitzel .................. G06F 8/64 717/168 |

(Continued)

FOREIGN PATENT DOCUMENTS

EP    2482137    8/2012

OTHER PUBLICATIONS

Richard S. Hall. et al., The Software Dock: A Distributed, Agent-based Software Deployment System, 1997, retrieved online on Apr. 25, 2016, pp. 1-23. Retrieved from the Internet: <URL: http://www.ics.uci.edu/~andre/papers/T1.pdf>.*

(Continued)

*Primary Examiner* — Thuy Dao
*Assistant Examiner* — Hanh T Bui
(74) *Attorney, Agent, or Firm* — Greenberg Traurig LLP

(57) ABSTRACT

Software is updated via a self-contained executable that includes software update patch for updating pre-existing software, and an updater package including at least one predetermined required computer state condition. Executing the self-contained executable on a client computer includes investigating a state of the client computer, and determining whether the state of the client computer matches the at least one predetermined required computer state condition. When the state of the client computer matches the at least one predetermined required computer state condition, the software update patch is installed. When the state of the client computer does not match the predetermined required computer state condition, the installation is terminated or, alternatively, the client computer is forced into a state that matches the predetermined required computer state condition and the software update patch installed.

15 Claims, 7 Drawing Sheets

(56) References Cited

U.S. PATENT DOCUMENTS

| | | | |
|---|---|---|---|
| 7,487,495 B2 | 2/2009 | Usov | |
| 7,784,045 B2 * | 8/2010 | Bowers | G06F 11/3684 717/168 |
| 7,823,147 B2 | 10/2010 | Moshir et al. | |
| 7,849,514 B2 | 12/2010 | Usov et al. | |
| 7,870,606 B2 | 1/2011 | Peretti | |
| 8,001,536 B2 | 8/2011 | Usov | |
| 8,060,924 B2 | 11/2011 | Usov | |
| 8,407,687 B2 | 3/2013 | Moshir et al. | |
| 8,474,011 B2 | 6/2013 | Usov | |
| 8,707,444 B2 | 4/2014 | Kelly et al. | |
| 8,719,812 B1 | 5/2014 | Myers et al. | 717/174 |
| 8,745,064 B2 | 6/2014 | Carter | |
| 9,152,484 B2 * | 10/2015 | Vidal | G06F 8/65 |
| 2003/0033313 A1 * | 2/2003 | Zweifel | G06F 8/61 |
| 2004/0003390 A1 * | 1/2004 | Canter | G06F 8/61 717/178 |
| 2005/0027846 A1 * | 2/2005 | Wolfe | G06F 8/64 717/176 |
| 2005/0132348 A1 | 6/2005 | Meulemans et al. | 717/168 |
| 2006/0048134 A1 * | 3/2006 | Napier | G06F 8/65 717/169 |
| 2006/0271923 A1 * | 11/2006 | Bantz | G06F 8/60 717/168 |
| 2009/0172658 A1 * | 7/2009 | Wood | G06F 8/61 717/174 |
| 2009/0205040 A1 * | 8/2009 | Zunke | G06F 8/65 726/14 |
| 2011/0029966 A1 | 2/2011 | Moshir et al. | |
| 2011/0214112 A1 * | 9/2011 | Vidal | G06F 8/65 717/168 |
| 2011/0296248 A1 * | 12/2011 | Vidal | G06F 8/65 714/38.13 |
| 2012/0047556 A1 | 2/2012 | Usov | |
| 2012/0066229 A1 | 3/2012 | Carter | |
| 2012/0090033 A1 | 4/2012 | Kelly et al. | |
| 2013/0047144 A1 * | 2/2013 | Chalmers | G06F 8/665 717/168 |
| 2013/0290662 A1 | 10/2013 | Teal | |
| 2014/0208107 A1 | 7/2014 | Kelly et al. | |
| 2015/0067665 A1 * | 3/2015 | Thomas | G06F 8/65 717/168 |

OTHER PUBLICATIONS

Xeno Kovah et al., New Results for Timing-Based Attestation, IEEE 2012, retrieved online on Apr. 25, 2016, pp. 239-253. Retrieved from the Internet: <URL: http://www.ieee-security.org/TC/SP2012/papers/4681a239.pdf>.*

Extended Search Report and Opinion, dated Oct. 14, 2015, from corresponding European Patent Application No. 15165908.3.

* cited by examiner

SELF-CONTAINED EXECUTABLE FOR PREDETERMINED SOFTWARE UPDATING

BACKGROUND

General purpose computer software, such as WINDOWS, JAVA, and ADOBE, is frequently updated. In fact, "Patch Tuesday" is the name given to the day each month that MICROSOFT releases security and other patches for their operating systems and other software. Patch Tuesday is generally the second Tuesday of each month.

SUMMARY OF THE DISCLOSURE

Broadly, the present disclosure relates to a self-contained executable for updating software, and systems and methods relating to the same. In one aspect, a method comprises downloading a self-contained executable to data storage of a client computer. The self-contained executable may comprise at least: (i) a software update patch for updating pre-existing software on the client computer (ii) an updater package associated with the software update patch, wherein the updater package includes at least one predetermined required computer state condition; and (iii) a package processing engine. The method may include executing, via a processor of the client computer, the self-contained executable. The executing may comprise: (i) activating the package processing engine; (ii) reading, via the package processing engine, the at least one predetermined required computer state condition of the updater package; (iii) investigating, in response to the reading, a state of the client computer; and (iv) determining, based at least on the investigating step, whether the state of the client computer matches the at least one predetermined required computer state condition of the updater package. The method may include, in response to the executing step, completing via the processor of the client computer, a predetermined action wherein, when the state of the client computer matches the at least one predetermined required computer state condition, the completing may comprise installing the software update patch on the client computer. When the state of the client computer does not match the predetermined required computer state condition, the completing may comprise completing a predetermined step selected from the group consisting of: (I) terminating the completing step; and (II) forcing the client computer into a state that matches the predetermined required computer state condition of the updater package, and installing the software update patch on the client computer.

In one embodiment, all of the downloading, executing, and completing a predetermined action steps may be completed in the absence of user input at the client computer.

In one embodiment, the software update patch is a first software update patch, the updater package is a first updater package, the predetermined required computer state condition is a first predetermined required computer state condition, and the self-contained executable comprises at least a second software update patch associated with a second updater package, wherein the second updater package includes at least a second predetermined required computer state condition. When the state of the client computer matches both the first and second predetermined required computer state conditions of the first and second updater packages, the completing may comprise installing both the first and second software update patches on the client computer. When the state of the client computer does not match at least one of the first and second predetermined required computer state conditions of the first and second updater packages, the completing may comprise completing a predetermined step selected from the group consisting of: (I) terminating the completing step; and (II) forcing the client computer into a state that matches both the predetermined required computer state conditions of the first and second updater packages, and installing both the first and second software update patches on the client computer.

In one embodiment, prior to the activating step, an administrative command may be first passed to the self-contained executable. In response to the activating step, the administrative command may be second passed from the self-contained executable to the package processing engine. When the state of the client computer does not match the predetermined required computer state condition, the completing may comprise evaluating by the package processing engine an administrative command, wherein the administrative command relates to either the terminating step or the forcing step. In response to the evaluating step, the predetermined action step may be completed. In one embodiment, the administrative command comprises a command line argument. In one embodiment, the first passing step comprises passing the administrative command from a command line interface on a host computer to the client computer. In another embodiment, the client computer is a first client computer, and the first passing step comprises passing the administrative command from the host computer to both the first client computer and at least a second client computer.

In one embodiment, the client computer is a first client computer, and the downloading step comprises downloading the self-contained executable from a host computer over a network to both the first client computer and at least a second client computer.

In one embodiment, the method comprises, prior to the downloading step: authoring at an authoring computer, the self-contained executable, and then sending the self-contained executable to the host computer wherein the authoring computer is remote of both the host computer and the client computer. The authoring may comprise receiving the software update patch, and configuring the updater package associated with the software update patch. The updater package may be configured in accordance with one or more attributes of the software update patch, and one or more required computer state conditions of the software update patch. In one embodiment, the authoring comprises authoring an .XML file as the updater package.

In another aspect, a system comprises a client computer. The client computer may comprise a processor, volatile memory, a graphical user interface, and data storage. A self-contained executable may be located in the data storage. The self-contained executable may comprise at least a software update patch, an updater package associated with the software update patch, and a package processing engine. The updater package may include at least one predetermined required computer state condition. The self-contained executable may be configured to activate the package processing engine so as to read the at least one predetermined required computer state condition of the updater package, investigate a state of the client computer, and determine whether the state of the client computer matches the at least one predetermined required computer state condition of the updater package. In one embodiment, the system may include a host computer connected to the client computer via a network, wherein the host computer is configured to enable an administrator to select an administrative command and pass the administrative command to the self-contained executable on the client computer. In one embodiment, the system may include an authoring computer connected to the host computer via a network, wherein the authoring computer is configured to: (i) enable an author to author the self-contained executable and configure the updater package, and (ii) provide the self-contained executable to the host computer.

These and other aspects and advantages, and novel features of this new technology are set forth in part in the description that follows and will become apparent to those skilled in the art upon examination of the following description and figures, or may be learned by practicing one or more embodiments of the technology provided for by the present disclosure.

DETAILED DESCRIPTION

Figure 1:
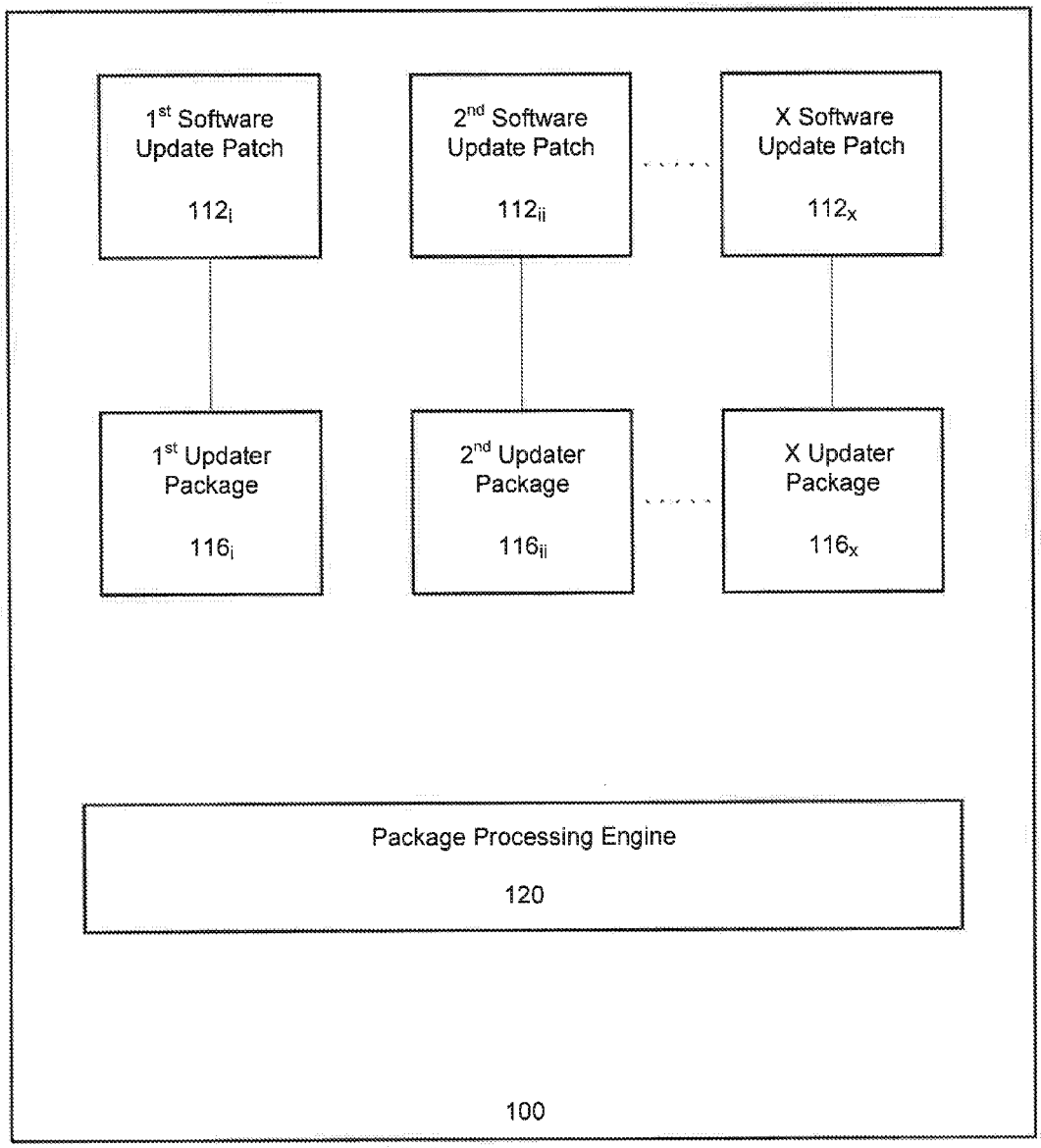
FIG. 1 is a schematic illustration of one embodiment of a self-contained executable useful for updating software.

Reference is now made to the accompanying figures which at least partially assist in describing aspects of the technology disclosed herein. Unless otherwise indicated, the following definitions apply in relation to the accompanying figures and the claims set forth below.

As used herein, a "computer" is a device that can be programmed to carry out one or more sets of arithmetic or logical operations (e.g., software). A computer comprises at least a processor (330), volatile memory (340), and data storage (320). A computer user may interact with a computer via a graphical user interface (350).

As used herein, a "client computer" and the like means a computer for general purpose use by a user and configured to receive and execute a self-contained executable. One or more client computers may be connected, for example via a network, to a host computer.

As used herein, a "host computer" and the like means an administrator-controlled computer connected, via a network, to at least one client computer to which the host computer provides at least a self-contained executable.

As used herein, a "self-contained executable" and the like means an executable that includes at least a software update patch, an updater package, a package processing engine and any other necessary computer code and/or data to perform its intended function of updating pre-existing software on a client computer.

As used herein, a "software update patch" and the like means software for updating pre-existing software on a client computer. In one embodiment, the software update patch is produced by a third party software vendor. In one embodiment, the software update patch comprises one or more .MSP and/or .MSI files, among others.

As used herein, an "updater package" and the like means software configured to: (a) include at least one required computer state condition and (b) be read by a package processing engine. An updater package may also include, for example, one or more identifiers of one or more software update patches, and/or one or more instructions to the package processing engine. In one embodiment, the updater package is in the form of one or more .XML files.

As used herein, a "package processing engine" and the like means software, e.g., executable software, configured to read the information contained in at least one updater package. The package processing engine may also be configured, for example, to execute one or more processes. The package processing engine may be triggered to execute a process, for example, in response to reading of one or more updater packages. In one embodiment, the package processing engine is in the form of an .EXE file.

As used herein, "pre-existing software" and the like means software that is already installed on (e.g., saved in data storage of) a client computer when the client computer receives a self-contained executable.

As used herein, a "required computer state condition" and the like means a condition of the client computer that is required to properly install at least one software update patch. For example, in order to install a software update patch, and thereby update pre-existing software on a client computer, a required computer state condition may comprise the condition of that pre-existing software being inactive (i.e., in a non-running state). As another example, a required computer state condition may comprise a specific value associated with the pre-existing software such as product version, modified date, or the presence or absence of a specific file. In still another example, a required computer state condition may comprise the presence or absence of a specific value in the registry of the client computer.

As used herein, a "predetermined required computer state condition" and the like means a required computer state condition that is determined in advance of the execution of the self-contained executable. The "predetermined required computer state condition" may be stored in the self-contained executable being provided to a client computer.

As used herein, "executing" and the like means to run software, causing the software to carry out its instructions. In one embodiment, an executing step may comprise causing an .EXE file to run, thereby causing this .EXE file to carry out its instructions.

As used herein, "activating the package processing engine" and the like means loading at least some of the software of the package processing engine into volatile memory of a client computer, thereby preparing the package processing engine for execution.

As used herein, "reading a predetermined required computer state condition" and the like means interpreting at least one condition of the predetermined required computer state condition contained in an updater package.

As used herein, a "state of a computer" and the like means at least one condition of a computer at a particular moment. For example, a state of a computer may include a particular software file being currently in use, a processor type, a memory type, a memory amount, or available data storage, among other computer states.

As used herein, "investigating a state of the client computer" and the like means determining at least one condition of the client computer at a particular moment. For example, investigating a state of the client computer may include determining whether a file saved in data storage of the computer is currently in use by any software running on the computer, among other states.

As used herein, "in the absence of user input at the client computer" and the like means without input from any human user of the client computer. In one embodiment, a step completed in the absence of user input may comprise installing a software update patch in the background of the client computer (e.g., the software update patch may be installed on the client computer in the absence of knowledge of the user of the client computer and/or in the absence of displaying the software updating process on the graphical user interface of the client computer).

As used herein, a "command line argument" and the like means values, e.g., text, which may be entered, for example, by typing the values into a command line interface or via a graphical user interface. Non-limiting examples of command line arguments include "CloseRunningApp", "FailIfAppRunning", or "/Verbose", among others.

As used herein, a "command line interface" and the like means a user interface (e.g., a DOS command line interface) in which the user responds to a visual prompt by typing in a command (e.g., a command line argument) on a command line.

As used herein, "passing the administrative command to the self-contained executable" and the like means conveying an administrative command, (e.g., a command line argument), as a variable to the self-contained executable. For example, the command line entry "C:\desktop>ASoftwareUpdater.exe CloseRunningApp", may pass the administrative command "CloseRunningApp" to the self-contained executable.

As used herein, "passing the administrative command from the self-contained executable to the package processing engine" and the like means conveying an administrative command, (e.g., a text string), as a variable from the self-contained executable to the package processing engine.

As used herein, a "network" and the like means a system of electronic communication that allows computers to exchange electronic information.

As used herein, a "third party software vendor" means an outside entity that provides software and related software update patches.

As used herein, an "authoring computer" means a computer that is used for authoring a self-contained executable. As described below, the authoring may comprise: (a) receiving a software update patch from a third party software vendor, and (b) configuring an updater package associated with the update patch.

Referring now to the figures, various systems and methods for updating software are illustrated. In reference now to FIG. 1, one embodiment of a self-contained executable is illustrated. In the illustrated embodiment, the self-contained executable (100) includes a package processing engine (120), a plurality of software update patches ($112_i$ through $112_x$), and a plurality of updater packages ($116_i$ through $116_x$) wherein each updater package is associated with a corresponding software update patch. Each updater package includes at least one predetermined required computer state condition. While the illustrated embodiment includes several software update patches ($112_i$-$112_x$) and several corresponding updater packages ($116_i$-$116_x$), the self-contained executable (100) may include a package processing engine (120), and only one software update patch (112) and one corresponding updater package (116) associated with the one software update patch (112).

Figure 2:
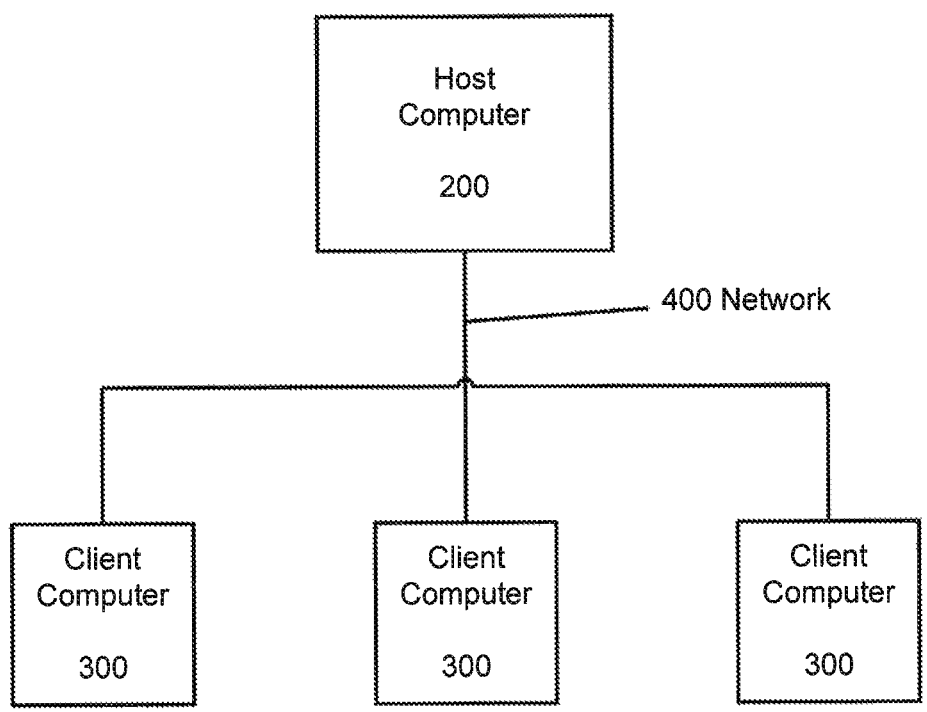
FIG. 2 is a schematic illustration of one embodiment of a network connecting a host computer to a plurality of client computers.
Figure 3:
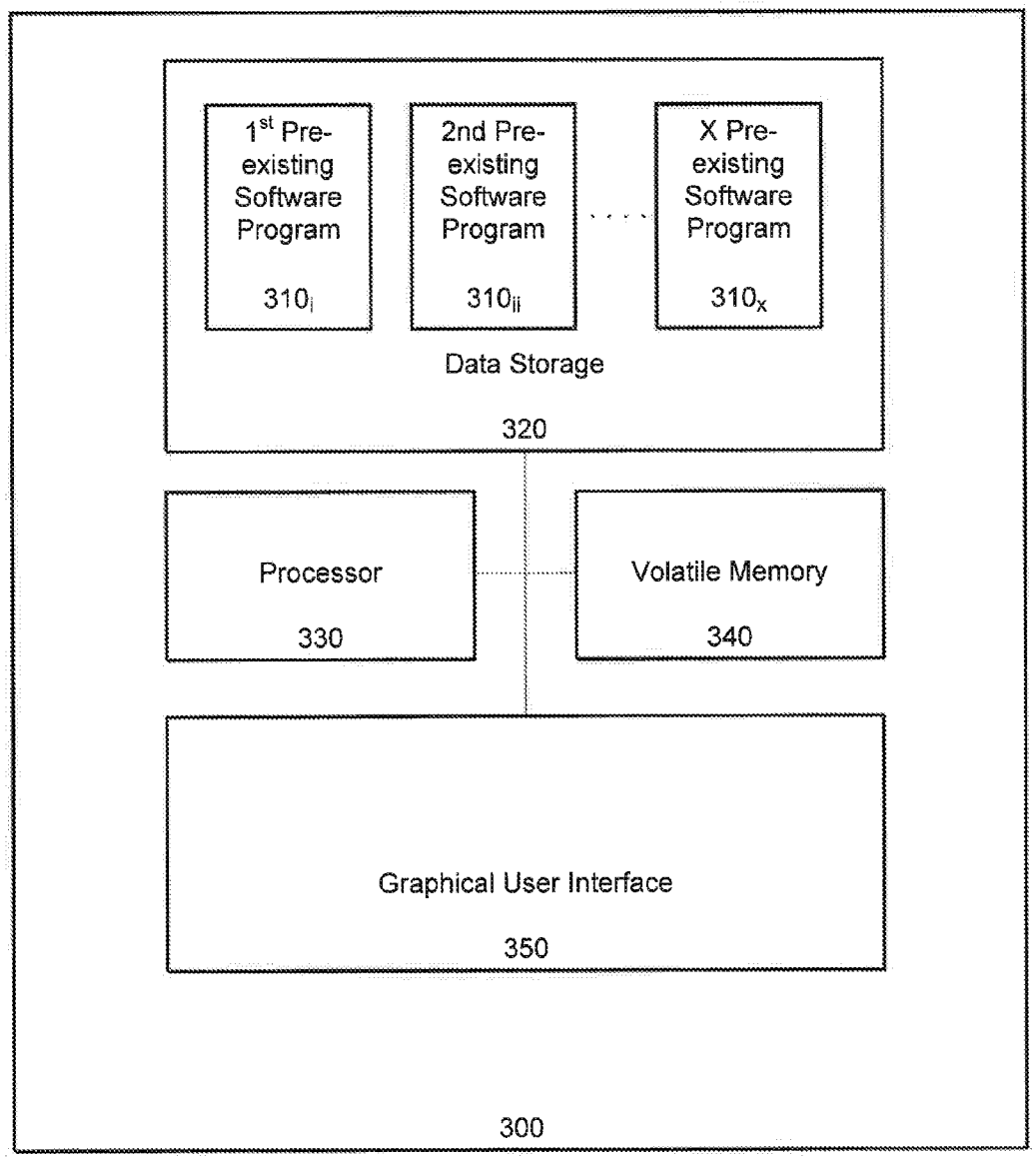
FIG. 3 is a schematic illustration of one embodiment of a client computer comprising various components.
Figure 5:
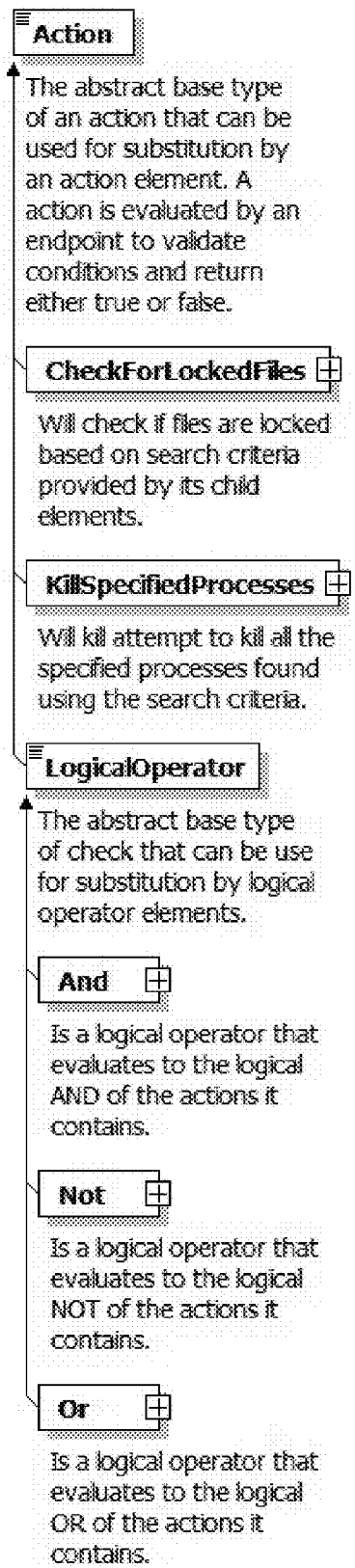
FIG. 5 is a schematic illustration of one embodiment of actions and logical operators that a package processing engine may use.
Figure 7:
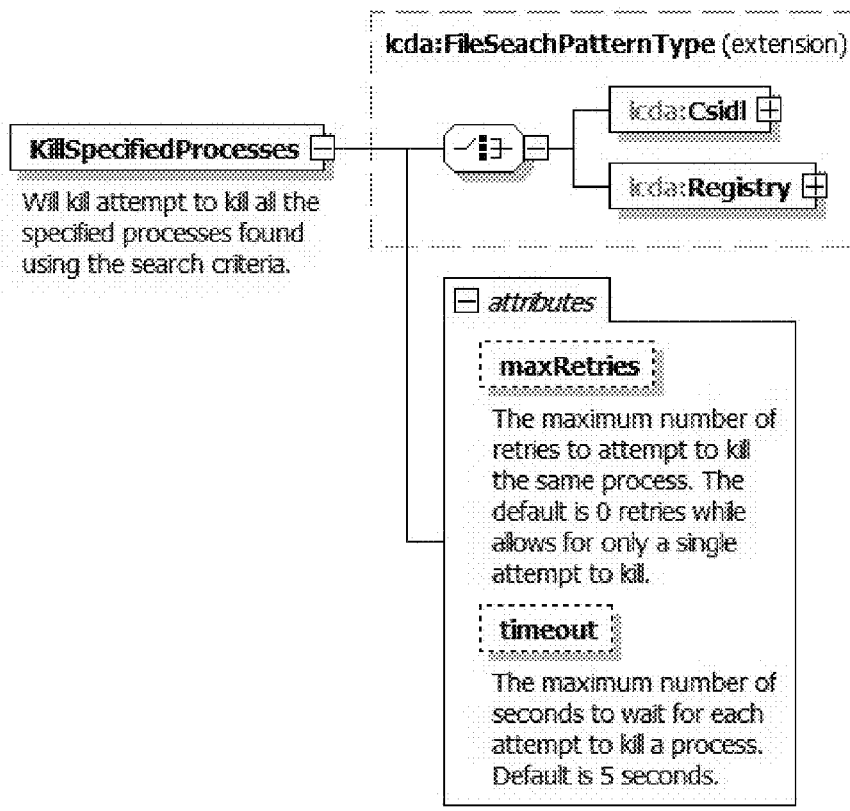
FIG. 7 is a schematic illustration of one embodiment of a kill specified process action of a package processing engine.

Referring now to FIG. 2, one embodiment of a network (400) connecting a host computer (200) to a plurality of client computers ($300_i$ through $300_x$) is illustrated. Referring now to FIGS. 1-3, in one embodiment, a self-contained executable (100) may be downloaded, via the network (400), from the host computer (200) to at least some of the plurality of client computers ($300_i$ through $300_x$), such as all of the client computers ($300_i$ through $300_x$). In the illustrated embodiment, the host computer (200) is a single host computer, however, in another embodiment, the host computer may comprise a plurality of host computers, for example, a plurality of host computers connected via a network. In one embodiment, once downloaded to a first client computer ($300_i$) (e.g., to data storage 320), the self-contained executable (100) may execute on the first client computer ($300_i$) via processor (330). In this regard, execution of the self-contained executable (100) may include activating the package processing engine (120), reading at least one predetermined required computer state condition of the first updater package ($116_i$), investigating a state of the first client computer ($300_i$) and determining whether the state of the client computer matches the at least one predetermined required computer state condition. In response to the executing, the client computer ($300_i$) may complete a predetermined action. The executing and completing a predetermined action steps may be facilitated by actions and/or logical operators of the self-contained executable (100). Referring now to FIG. 5, one embodiment of exemplary actions and logical operators of the self-contained executable (100) is shown. The predetermined action depends on whether the state of the client computer ($300_i$) matches the at least one predetermined required computer state condition. When the state of the client computer ($300_i$) matches the at least one predetermined required computer state condition, the completing comprises installing the first software update patch (112) on the client computer (300). When the state of the client computer ($300_i$) does not match the predetermined required computer state condition, the completing comprises completing a predetermined step, such as, for example, (I) terminating the completing step or (II) forcing the client computer ($300_i$) into a state that matches the at least one predetermined required computer state condition of the updater package ($116_i$), and installing the software update patch ($112_i$) on the client computer ($300_i$). Referring now to FIG. 7, one embodiment of forcing the client computer ($300_i$), via a kill specified process action, into a state that matches the at least one predetermined required computer state condition is shown. Thus, before updating any software, the client computer ($300_i$) may check, via the self-contained executable (100), whether the client computer is in a proper state to be updated. Furthermore, if the client computer ($300_i$) is not in a proper state to be updated, the self-contained executable may be configured to force the client computer ($300_i$) into a proper state for being updated, or, alternatively, terminate the update operation, thereby ensuring only proper software updates are installed. In one embodiment, the self-contained executable (100) may be downloaded, executed and completed in the absence of any user input at the client computer ($300_i$)(e.g., a silent update). Thus, software on the client computer ($300_i$) may be updated without any input from and/or without any knowledge of the user of the client computer ($300_i$).

As described above, execution of the self-contained executable (100) may include reading the at least one predetermined required computer state condition of the first updater package (116). Reading the at least one predetermined required computer state condition may comprise interpreting, via the package processing engine (120), the information contained in the first updater package (116$_i$). In one embodiment, the first updater package (116$_i$) is an .XML file. One example of an updater package in the form of an .XML file relating to updating of JAVA is shown below.

```
<?xml version="1.0"?>
-<lcdp:DeploymentPackages
xsi:schemaLocation="http://schemas.lumension.com/content/v1/deploymentpackages
    ../../../libs/schemas/DeploymentPackages/DeploymentPackages.xsd"
xmlns:lcdp="http://schemas.lumension.com/content/v1/deploymentpackages"
    xmlns:xsi="http://www.w3.org/2001/XMLSchema-instance">
    - <lcdp:Group name="FailIfAppRunning"> <lcdp:Action filename="action-
        FailIfAppRunning.xml"/>
        <lcdp:Product filename="jre1.7.0_55_x86.msi"
            properties="REBOOT=ReallySuppress MOZILLA=1 IEXPLORER=1
            AgreeToLicense=YES JAVAUPDATE=0"/>
        </lcdp:Group>
    - <lcdp:Group name="CloseRunningApp">
        <lcdp:Action filename="action-CloseRunningApp.xml"/>
        <lcdp:Product filename="jre1.7.0_55_x86.msi"
            properties="REBOOT=ReallySuppress MOZILLA=1 IEXPLORER=1
            AgreeToLicense=YES JAVAUPDATE=0"/>
        </lcdp:Group>
</lcdp:DeploymentPackages>
```

Figure 6:
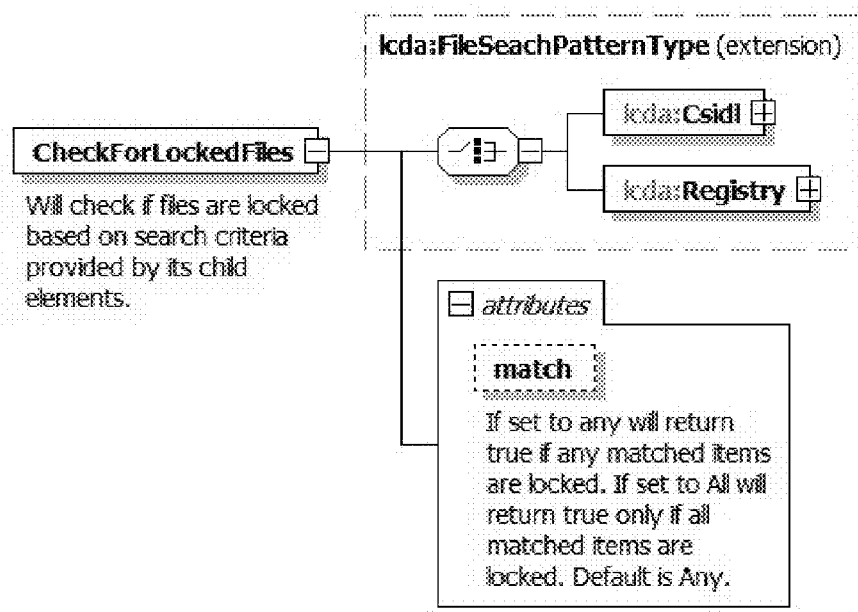
FIG. 6 is a schematic illustration of one embodiment of a check for locked files action of a package processing engine.
Figure 8:
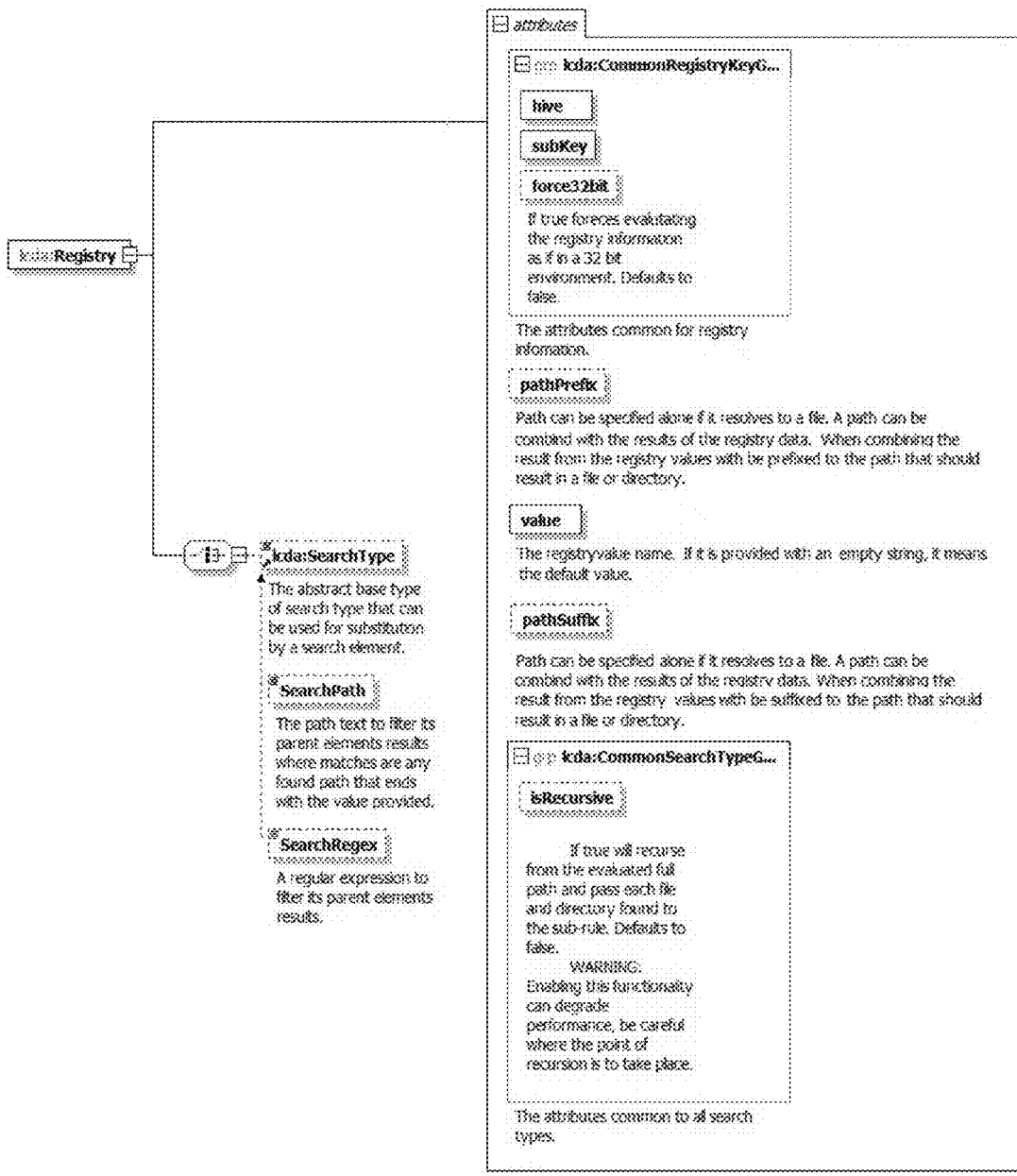
FIG. 8 is a schematic illustration of one embodiment of examining a computer registry.

As described above, the execution of the self-contained executable (100) may include investigating a state of the first client computer (300$_i$). Investigating the state of client computer may comprise for example, examining a computer registry of the client computer (300$_i$) and/or examining a filesystem of the client computer (300$_i$) to ascertain which software may currently be running on the client computer (300$_i$). Referring now to FIG. 8, one embodiment of examining a computer registry is shown. In another embodiment, investigating the state of the client computer may comprise checking for locked files on the client computer (300$_i$). Referring now to FIG. 6, one embodiment of checking for locked files is shown.

As described above, the execution of the self-contained executable (100) may include determining whether the state of the client computer matches the at least one predetermined required computer state condition. In this regard, the predetermined required computer state condition(s) of the updater package (116) may include registry values/requirements and/or filesystem values/requirements. In one embodiment, an updater package includes at least two predetermined required computer state condition(s). In another embodiment, an updater package includes at least three or more predetermined required computer state condition(s).

As described above, a first software update patch (112) may be installed by the self-contained executable (100) via a first updater package (116$_i$). In one embodiment, the self-contained executable contains only the first software update patch (112$_i$) and corresponding first updater package (116$_i$). In other embodiments, the self-contained executable may contain multiple software update patches (112$_i$ through 112$_x$) and updater packages (116$_i$ through 116$_x$), as illustrated. In this regard, a second software update patch (112$_{ii}$) may also be installed by the self-contained executable (100) via a second updater package (116$_{ii}$). The second updater package (116$_{ii}$) may include at least a second predetermined required computer state condition which may be the same as or different than the first predetermined required computer state condition. The second predetermined required computer state condition may be read by the package processing engine (120) in the same manner as the first predetermined required computer state condition. The self-contained executable (100) may then determine whether the state of the client computer (300) matches one of or both of the first and second predetermined required computer state conditions of the first and second updater packages (116$_i$, 116$_{ii}$).

In one embodiment, when the state of the client computer (300) matches both the first and second predetermined required computer state conditions of the first and second updater packages (116$_i$, 116$_{ii}$), the completing step may comprise installing both the first and second software update patches (112$_i$, 112$_{ii}$) on the client computer (300). In one embodiment, when the state of the client computer (300) does not match at least one of the first and second predetermined required computer state conditions, the completing comprises completing a predetermined step. This predetermined step may be one of, for example, (I) terminating the completing step, or (II) forcing the client computer (300) into a state that matches both the predetermined required computer state conditions of the first and second updater packages (116$_i$, 116$_{ii}$), and installing both the first and second software update patches (112$_i$, 112$_{ii}$) on the client computer (300). Similar principles apply when the self-contained executable contains three or more software update patches (112$_i$ through 112$_x$) and three or more corresponding updater packages (116$_i$ through 116$_k$). Furthermore, although the updater packages (116) are illustrated as being separate files, all necessary updater packages (116) may be included in a single file. Furthermore, a single updater package (116) may alternately be split among several files.

As described above, when the state of the client computer (300) does not match the one or more predetermined required computer state conditions, the completing comprises completing a predetermined step. This predetermined step may be predetermined, for example, via an administrative command issued, for example, by an administrative user of the host computer (200) and at the host computer (200). The administrative command may, for example, command the self-contained executable (100) to either (I) terminate the installation or (II) force the client computer (300) into a state that matches the one or more predetermined required computer state conditions. This administrative command may be passed to the self-contained executable (100) concomitantly to the execution of the self-contained executable (100) on the client computer (300). In one embodiment, an administrator may pass the administrative command from a command line interface on a host computer (200) to the self-contained executable (100) on the client computer (300). In another embodiment, the administrator may pass the administrative command via a graphical user interface of the host computer (200) to the self-contained executable (100) on the client computer (300). In response to activating the package processing engine (120), the self-contained executable (100) may then pass the administrative command to the package processing engine (120). If the determination is then made that the state of the client computer (300) does not match the predetermined required computer state conditions, the self-contained executable (100) may use the predetermined administrative command to decide whether to (I) terminate the updating or (II) force the client computer (300) into a state that matches the predetermined required computer state conditions.

Figure 4:
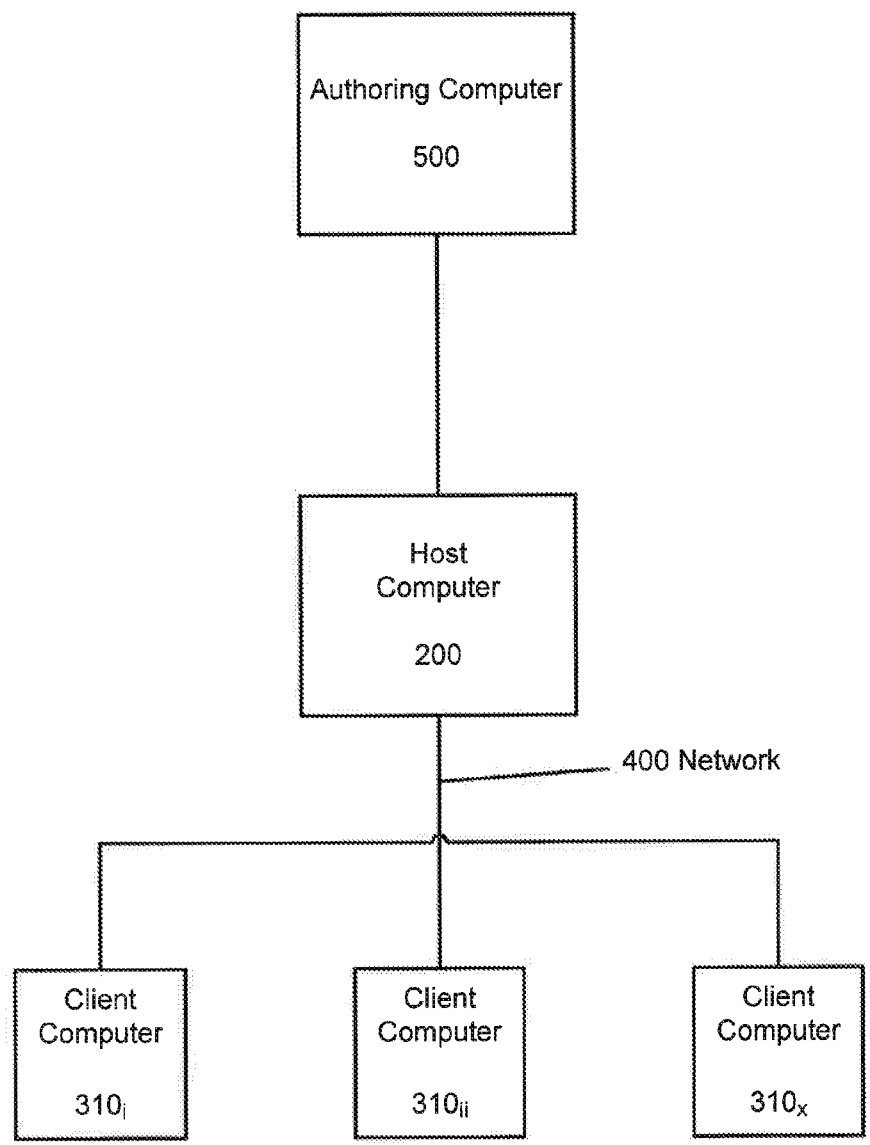
FIG. 4 is a schematic illustration of one embodiment of an authoring computer connected to a host computer, wherein the host computer is connected to a plurality of client computers via a network.

Referring now to FIG. 4, one embodiment of an authoring computer (500) configured to provide the self-contained executable (100) to the host computer (200) and the corresponding client computers ($300_i$ through $300_x$) is shown. The authoring computer (500) may be remote of both the host computer (200) and the client computer (300). Prior to providing the self-contained executable (100) to the host computer (200), an author may author the self-contained executable (100) at the authoring computer (500). The authoring may comprise receiving a software update patch (112), from, for example, a third party software vendor. The authoring may further comprise configuring an updater package (116) associated with the software update patch (112). The updater package (116) may be configured in accordance with, for example, one or more attributes of the software update patch (112), and one or more required computer state conditions of the software update patch (112) and/or the client computer (300). In one embodiment, the authoring may comprise authoring an .XML file as the updater package (116). In one embodiment, the author may author a self-contained executable (100) having one software update patch (112) and one updater package (116). In another embodiment, the author may author a self-contained executable (100) having a plurality of software update patches ($112_i$ through $112_x$) and a plurality of associated updater packages ($116_i$ through $116_x$). Thus, an author at the authoring computer (500) may author the self-contained executable (100) and provide it to an administrator at the host computer (200). The administrator at the host computer (200) may then choose to configure the behavior of the self-contained executable (100) via an administrative command, as described above, after which the self-contained executable (100) is received at one or more client computers ($300_i$ through $300_x$). Thus, software on one or more client computers ($300_i$ through $300_x$) may be updated (e.g., without input from a user at the client computer (300)).

Referring back to FIG. 3, one embodiment of a client computer (300) is shown. The illustrated client computer (300) generally includes the following interconnected components: a processor (330), a volatile memory (340), data storage (320) and a graphical user interface (350). The client computer (300) may load software from data storage (320) to volatile memory (340), and execute the software via the processor (330). The graphical user interface (350) may receive instructions from a user and/or display information to the user.

While the invention(s) is (are) described with reference to various implementations and embodiments, it will be understood that these embodiments are illustrative and that the scope of the invention(s) is not limited to them. Many variations, modifications, additions, and improvements are possible. Plural instances may be provided for components, operations or structures described herein as a single instance. In addition, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s). While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. A method, comprising:
   downloading, from a host computer, a self-contained executable to data storage of a client computer, the self-contained executable comprising a software update patch for updating pre-existing software on the client computer and an updater package associated with the software update patch, the updater package including at least one predetermined required computer state condition, wherein the self-contained executable has been authored at an authoring computer, prior to the downloading, after the software update patch is received by the authoring computer, by configuring the updater package in accordance with one or more attributes of the software update patch, and one or more required computer state conditions of the software update patch, and wherein, prior to the downloading, the authoring computer has sent, over a network, the self-contained executable to the host computer;
   executing, via a processor of the client computer, the self-contained executable, the executing comprising:
      reading the at least one predetermined required computer state condition from the updater package;
      in response to the reading, investigating a state of the client computer, the investigating comprising examining a registry or filesystem of the client computer to determine software currently running on the client computer;
      determining, based at least on the investigating, whether the state of the client computer matches the at least one predetermined required computer state condition; and
      in response to determining that the state of the client computer does not match the at least one predetermined required computer state condition, forcing the client computer into a state that matches the at least one predetermined required computer state condition, and installing the software update patch on the client computer.

2. The method of claim 1, further comprising completing, in the absence of user input at the client computer, the downloading the self-contained executable, and the executing the self-contained executable.

3. The method of claim 1, wherein the software update patch is a first software update patch, the updater package is a first updater package, the predetermined required computer state condition is a first predetermined required computer state condition, the self-contained executable comprises at least a second software update patch associated with a second updater package, and the second updater package includes at least a second predetermined required computer state condition.

4. The method of claim 3, further comprising:
when the state of the client computer matches the first and second predetermined required computer state conditions, installing the first and second software update patches on the client computer;
when the state of the client computer does not match at least one of the first and second predetermined required computer state conditions, forcing the client computer into a state that matches the first and second predetermined required computer state conditions, and installing the first and second software update patches on the client computer.

5. The method of claim 1, further comprising in response to determining that the state of the client computer does not match the predetermined required computer state condition, evaluating, by a package processing engine, an administrative command relating to the forcing.

6. The method of claim 5, wherein the executing further comprises:
prior to activating a package processing engine of the self-contained executable, passing the administrative command to the self-contained executable;
in response to the activating, passing the administrative command from the self-contained executable to the package processing engine.

7. The method of claim 6, wherein the administrative command comprises a command line argument.

8. The method of claim 7, wherein the passing to the self-contained executable comprises passing the administrative command from a command line interface on the host computer to the client computer.

9. The method of claim 8, wherein the client computer is a first client computer, and wherein the passing to the self-contained executable comprises passing the administrative command from the host computer to the first client computer and at least a second client computer.

10. The method of claim 1, wherein the client computer is a first client computer, and wherein the downloading further comprises downloading, from the host computer, over a network, the self-contained executable to at least a second client computer.

11. The method of claim 1, wherein the authoring further comprises authoring a file for the updater package.

12. The method of claim 1, wherein the self-contained executable further comprises a package processing engine, and the reading the at least one predetermined required computer state condition is performed via the package processing engine.

13. A system, comprising:
a client computer comprising a processor and data storage, the data storage storing a self-contained executable downloaded from a host computer, the self-contained executable comprising a software update patch, an updater package associated with the software update patch, and a package processing engine, wherein the self-contained executable has been authored at an authoring computer, prior to the downloading, after the software update patch is received by the authoring computer, by configuring the updater package in accordance with one or more attributes of the software update patch, and at least one predetermined required computer state condition of the software update patch, and wherein prior to the downloading, the authoring computer has sent, over a network, the self-contained executable to the host computer, the self-contained executable further configured to:
activate the package processing engine to read the at least one predetermined required computer state condition from the updater package;
investigate a state of the client computer, the investigating comprising examining a registry or filesystem of the client computer to determine software currently running on the client computer;
determine whether the state of the client computer matches the at least one predetermined required computer state condition;
in response to determining that the state of the client computer does not match the at least one predetermined required computer state condition, force the client computer into a state that matches the at least one predetermined required computer state condition; and
after the forcing into the state, install the software update patch on the client computer.

14. The system of claim 13, wherein the host computer is further configured to enable an administrator to select an administrative command and pass the administrative command to the self-contained executable on the client computer.

15. The system of claim 14, wherein the authoring computer is further configured to enable an author to configure the updater package.

* * * * *